(12) United States Patent
Ashwood-Smith et al.

(10) Patent No.: US 8,059,647 B2
(45) Date of Patent: Nov. 15, 2011

(54) MULTICAST IMPLEMENTATION IN A LINK STATE PROTOCOL CONTROLLED ETHERNET NETWORK

(75) Inventors: Peter Ashwood-Smith, Hull (CA); Guoli Yin, Nepean (CA); Hong Zhang, Kanata (CA); Nigel Bragg, Weston Colville (GB); David Allan, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 594 days.

(21) Appl. No.: 11/702,263

(22) Filed: Feb. 5, 2007

(65) Prior Publication Data

US 2007/0165657 A1 Jul. 19, 2007

Related U.S. Application Data

(63) Continuation-in-part of application No. 11/537,775, filed on Oct. 2, 2006, now Pat. No. 7,688,756.

(60) Provisional application No. 60/723,479, filed on Oct. 5, 2005, provisional application No. 60/735,884, filed on Nov. 14, 2005, provisional application No. 60/756,330, filed on Apr. 21, 2006.

(51) Int. Cl.
 *H04L 12/28* (2006.01)
(52) U.S. Cl. .................................. 370/390; 370/395.31
(58) Field of Classification Search ........................ None
See application file for complete search history.

(56) References Cited

U.S. PATENT DOCUMENTS 6,606,325 B1 * 8/2003 Cain ............................. 370/410
6,928,483 B1 * 8/2005 Cain ............................. 709/238
7,116,640 B2 * 10/2006 Tasman et al. ................ 370/252
7,151,758 B2 * 12/2006 Kumaki et al. ............... 370/331

(Continued)

FOREIGN PATENT DOCUMENTS

EP 0598969 11/1992

(Continued)

OTHER PUBLICATIONS

Garcia et al.: "LSOM: A Link State protocol Over MAC addresses for metropolitan backbones using Optical Ethernet switches", Proceedings of the second IEEE International Symposium on Network Computing and Applications (NCA 2003) Apr. 16-18, 2003, pp. 315-321.

(Continued)

*Primary Examiner* — Phirin Sam
(74) *Attorney, Agent, or Firm* — Kent Daniels; Blake, Cassels & Graydon LLP

(57) ABSTRACT

Forwarding state may be installed for sparse multicast trees in a link state protocol controlled Ethernet network by enabling intermediate nodes to install state for one or more physical multicast trees, each of which may have multiple logical multicast trees mapped to it. By mapping multiple logical multicasts to a particular physical multicast, and installing state for the physical multicast, fewer FIB entries are required to implement the multiple multicasts to reduce the amount of forwarding state in forwarding tables at the intermediate nodes. Mapping may be performed by destination nodes before advertising membership in the physical multicast, or may be performed by the intermediate nodes before installing state when a destination node advertises membership in a logical multicast. Intermediate nodes will install state for the physical multicast tree if they are on a shortest path between a source and at least one destination of one of the logical multicasts that has been mapped to the physical multicast.

17 Claims, 4 Drawing Sheets

U.S. PATENT DOCUMENTS

| | | | |
|---|---|---|---|
| 2002/0071442 A1* | 6/2002 | Li | 370/432 |
| 2003/0026268 A1* | 2/2003 | Navas | 370/400 |
| 2005/0047353 A1* | 3/2005 | Hares | 370/255 |
| 2005/0201273 A1* | 9/2005 | Shimizu | 370/216 |
| 2006/0013141 A1 | 1/2006 | Mutoh et al. | |
| 2006/0092940 A1* | 5/2006 | Ansari et al. | 370/392 |
| 2006/0187950 A1* | 8/2006 | Bou-Diab et al. | 370/432 |
| 2006/0285529 A1* | 12/2006 | Hares et al. | 370/338 |
| 2007/0019646 A1* | 1/2007 | Bryant et al. | 370/390 |
| 2007/0036178 A1* | 2/2007 | Hares et al. | 370/490 |
| 2009/0141657 A1* | 6/2009 | Dutt et al. | 370/254 |

FOREIGN PATENT DOCUMENTS

| | | |
|---|---|---|
| JP | 06-22491 | 8/1994 |
| WO | WO 02/078250 | 10/2002 |

OTHER PUBLICATIONS

Bolton etal.: "Analyses of the reverse path forwarding routing algorithm", Proceedings of the 2004 International Conference on Dependable Systems and Networks, (DSN 2004), Jun. 28-Jul. 1, 2004, pp. 485-494.

Ibanez et al.: "Alternative multiple spanning tree protocol (AMSTP) for optical Ethernet backbones", Proceedings of the $29^{th}$ Annual IEEE International Conference on Local Computer Networks, (LCN 2004), Nov. 16-18, 2004, pp. 744-751.

Brockners et al.: "Metro Ethernet—Deploying the extended Campus using Ethernet Technology", Cisco Syst. Inc., San Jose, CA, USA, This paper appears in: Proceedings of the $28^{th}$ Annual IEEE International Conference on Local Computer Networks (LCN 2003), Oct. 20-24, 2003, pp. 594-604.

International search report International application No. PCT/CA 2006/001614.

Norman Finn:, "Shortest Path Bridging" CISCO May 22, 2005, pp. 1-95, retrieved from Internet: URL: http://ieee802.org/1/files/public/docs2005/aq-nfinn-shortest-path-0905.pdf>.

R. Perlman, Sun, J.Touch, USC/ISI, A. Yegin, R. Samsung: "RBridges: Transparent Routing: draft-perlman-rbridge-02.txt" IETF Standard-Working-Draft, Internet Engineering Task Force, IETF, CH, No. 2., Feb. 19, 2005, XP015033879, ISSN: 0000-0004.

S. Hares NextHop Technologies: "Multicast Link State For Rbridges; draft-hares-thrill-multicast-00.txt", IETF, Standard-Working-Draft Internet Engineering Task Force, IETF, CH, Oct. 17, 2005, XP015042230 ISSN: 0000-0004.

J. Touch (ed.) USC/ISI: "Transparent Interconnection of Lots of Links (TRILL): Problem and Applicability Statement; draft-touch-thrill-prob-00.txt" IETF Standard-Working-Draft, Internet Engineering Task Force, IETF, CH, Nov. 17, 2005, XP015043109 ISSN: 0000-0004.

Supplementary European Search Report mailed Jun. 10, 2010 on European Patent Application No. 06 81 7645.

* cited by examiner

MULTICAST IMPLEMENTATION IN A LINK STATE PROTOCOL CONTROLLED ETHERNET NETWORK

CROSS-REFERENCE TO RELATED APPLICATIONS

This application is a Continuation In Part of U.S. patent application Ser. No. 11/537,775, filed Oct. 2, 2006 now U.S. Pat. No. 7,688,756, entitled "Provider Link State Bridging," which claims priority to U.S. Provisional Patent Application Ser. No. 60/723,479 filed Oct. 5, 2005, U.S. Provisional Patent Application Ser. No. 60/735,884 filed Nov. 14, 2005, and U.S. Provisional Patent Application Ser. No. 60/745,330 filed Apr. 21, 2006, the content of each of which is hereby incorporated herein by reference.

TECHNICAL FIELD

The present invention relates to Ethernet traffic routing protocols, and in particular to a multicast implementation in a link state protocol controlled Ethernet network.

BACKGROUND

In Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast on the network. Since routes were learned by broadcasting a frame and waiting for a response, and since both the request and response would follow the spanning tree, most if not all of the traffic would follow the links that were part of the spanning tree. This often led to over utilization of the links that were on the spanning tree and underutilization of the links that weren't part of the spanning tree.

To overcome some of the limitations inherent in Ethernet networks, a Provider Link State Bridging network (one example of a link state protocol controlled Ethernet network) was disclosed in application Ser. No. 11/537,775, filed Oct. 2, 2006, entitled "Provider Link State Bridging," the content of which is hereby incorporated herein by reference. In a link state protocol controlled Ethernet network, the network elements exchange link state routing information to enable the network elements to compute shortest paths through the network. Because shortest path routing is used, a shortest path tree may be computed from each source node to avoid the use of the Spanning Tree Protocol, so that link utilization may be increased on the network. Additional details of conventional Ethernet networks and the manner in which a link state protocol controlled Ethernet network may be configured to operate are disclosed in the parent application which was incorporated herein by reference and, for brevity, will be largely omitted from this application. Although the parent application mentions the use of multicast on a link state protocol controlled Ethernet network, it still would be advantageous to provide a way to reduce the amount of forwarding state that is required to implement multicast on a link state protocol controlled Ethernet network.

SUMMARY OF THE INVENTION

Forwarding state may be installed for sparse multicast trees in a link state protocol controlled Ethernet network by enabling intermediate nodes on the network to install forwarding state for one or more physical multicast trees rather than to multiple logical multicast trees. Logical multicast trees are mapped to one of the physical multicast trees, and the intermediate nodes only install state for the physical multicast trees. The mapping between logical and physical multicast trees may be performed by destination nodes or by the intermediate nodes. Intermediate nodes install state for the physical tree if they are on a shortest path between the source of the physical multicast tree and at least one destination of one of the logical multicasts that has been mapped to the physical multicast tree.

According to an embodiment of the invention, multiple logical multicasts may be grouped to a smaller number of physical multicasts, for example, by performing a hash on multicast ID and assigning the logical multicasts to a smaller number of physical multicast trees on the network. By grouping a larger number of logical multicasts into a smaller number of physical multicast trees, the intermediate nodes may implement fewer multicast trees on the network to enable traffic to be forwarded to subgroups of destinations from a given source without requiring the traffic to be flooded on the network. Mapping from logical to physical multicast trees may be performed by the destination nodes before advertising membership in a multicast. Alternatively, mapping from logical to physical multicast may be performed by the intermediate nodes before installing state for the multicast. In either instance the intermediate nodes on the network install forwarding state based on the physical multicast to reduce the amount of state required to be stored in the forwarding information base to support the multicast. The source may transmit multicast information using the physical multicast address or may transmit information on the multicast using the logical multicast address which is then converted to the proper physical multicast address before performing a lookup in the network element forwarding information base.

More than one logical multicast may be included in a given physical multicast, and the physical multicast may therefore include the superset of the destinations for each of the logical multicasts. When a multicast frame associated with a logical multicasts received by an intermediate node, the multicast frame will be forwarded to each of the destinations on the physical multicast that have been installed by the intermediate node. Since the physical multicast may include destinations other than required to support the logical multicast associated with the particular frame, the destinations will filter traffic received over the physical multicast tree to discard the frames that are part of the physical multicast but not part of a logical multicast to which they have subscribed. Other aspects and features of the present invention will become apparent to those ordinarily skilled in the art upon review of the following description of specific embodiment of the invention in conjunction with the accompanying figures.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
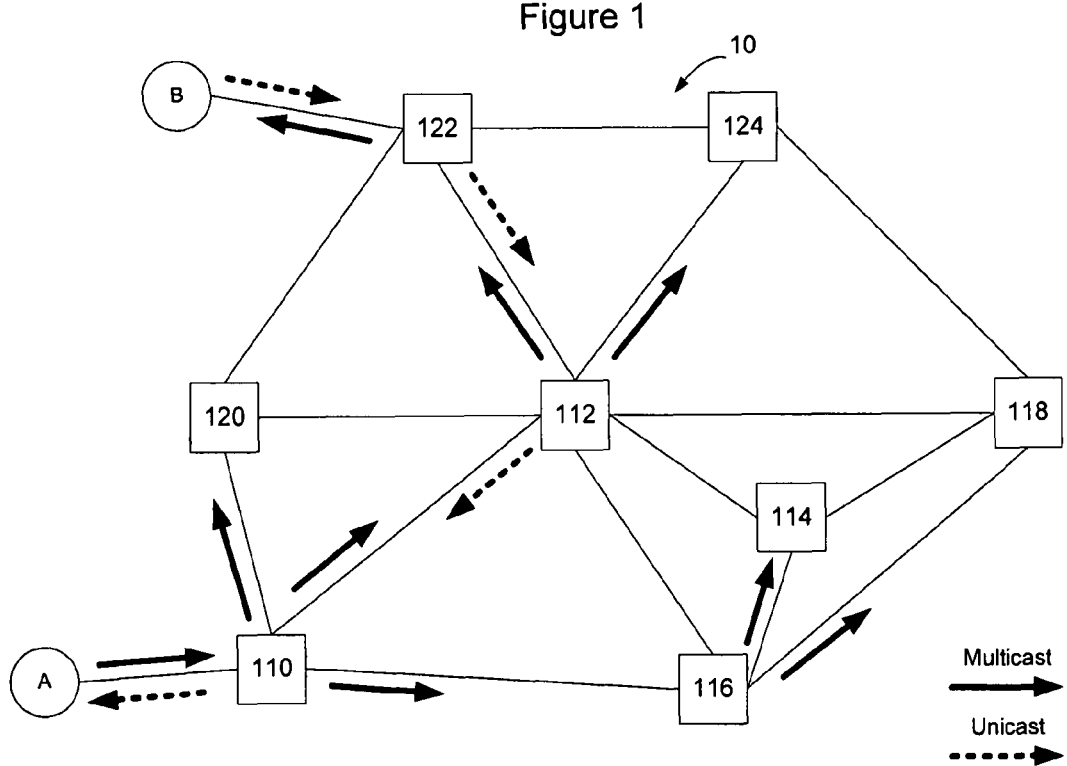
FIG. 1 is a schematic representation of a mesh network that may be used to implement a link state protocol controlled Ethernet network.

Using a link state protocol to control an Ethernet network enables the Ethernet network to be scaled from the LAN space to the WAN or provider network space by providing more efficient use of network capacity with loop-free shortest path forwarding. Rather than utilizing a learned network view at each node by using the Spanning Tree Protocol (STP) algorithm combined with transparent bridging, in a link state protocol controlled Ethernet network the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute a shortest path connectivity between any pair of bridges in the network, and individually can populate their forwarding information bases (FIBs) according to the computed view of the network. When all nodes have computed their role in the synchronized view and populated their FIBs, the network will have a loop-free unicast tree to any given bridge from the set of peer bridges; and a both congruent and loop-free point-to-multipoint (p2mp) multicast tree from any given bridge to the same set of peer bridges. The result is the path between a given bridge pair is not constrained to transiting the root bridge of a spanning tree and the overall result can better utilize the breadth of connectivity of a mesh.

Link state protocol controlled Ethernet networks provide the equivalent of Ethernet bridged connectivity, but achieve this via configuration of the network element FIBs rather than by flooding and learning. As such it can be used by emerging standards such as IEEE (Institute of Electrical and Electronics Engineers) 802.1ah draft standard entitled Provider Backbone Bridges (PBB) or MAC-in-MAC with configured forwarding of B-MACs (Backbone MAC) and trivial modifications to the PBB adaptation function, to map client broadcast behavior to multicast, such that client Ethernets can utilize the connectivity offered by the Link state protocol controlled Ethernet network without modification.

Link state protocol controlled Ethernet network operation may be combined with other control planes or transparent bridging via partitioning of the network via the use of virtual LANs (VLANs). A VLAN ID can be used to define one instance of the mesh at the control plane level, in the link state protocol controlled Ethernet network case this is driven by a distributed link state routing system. When VLAN partitioning of network function is used, the link state protocol controlled Ethernet network is side-by-side compatible with other Ethernet network technologies such as Provider Backbone Transport (PBT) as disclosed in commonly assigned U.S. patent application Ser. No. 10/818,685, filed Apr. 6, 2004, and entitled "Traffic Engineering in Frame-Based Carrier Networks", the content of which is hereby incorporated herein by reference.

Link state protocol controlled Ethernet networks generally use symmetrical link metrics such that connectivity between any two bridges follows the same path in both directions, and uses common metrics for unicast and multicast connectivity such that there is congruency of forwarding between packets which are multicast and packets which are unicast.

MAC configuration may be used to construct shortest path loop-free connectivity (for both unicast and multicast purposes) between a set of (slightly modified) 802.1ah provider backbone bridges in order to provide transparent LAN service to the C-MAC (Customer MAC) layer or other layer networks that can use a transparent LAN service. This requires the operation of a link state routing protocol within the provider backbone bridged network in lieu of the spanning tree protocol for the associated VLAN(s) and the piggybacking of MAC information on routing system advertisements.

When a transit bridge does not need to terminate unicast or multicast connectivity it may choose not to offer MAC information but will process MAC address advertisements from other bridges. In the 802.1ah case, edge bridges known as provider backbone bridges (PBBs) will just about always offer MAC information, while purely transit bridges will not.

At least two MAC addresses are associated with each bridge, one for unicast forwarding to the bridge and at least one for multicast forwarding from the bridge. The unicast MAC is used by peer bridges when sending packets to the bridge as the destination address for a packet, and identifies the bridge as the source for unicast or multicast traffic from the bridge to its' peers. The multicast address is used by the bridge when sending traffic to multiple peer bridges simultaneously to identify the specific multicast tree configured by the routing system. The multicast tree can be configured to deliver a packet to every bridge in the PLSB domain, thus implementing the broadcast function for the specific source bridge. It can optionally identify a strict subset of the broadcast tree to restrict delivery to just those bridges belonging to a particular community of interest, typically a client layer VPN.

Multiple multicast trees may be established from a given source. Particularly, where the multicast trees extend from the source to only a few of the destinations (sparse mode multicast) it may be desirable to implement multiple multicasts rather than multicasting to all destination nodes.

Multicast membership information may be transmitted using the link state advertisements that are used to transmit link state information in connection with the routing protocol. In this embodiment, the intermediate nodes will install forwarding state for particular multicast groups only if they are on a shortest path from one of the destination end nodes to the source.

Transmitting multicast membership information, such as multicast join messages and multicast leave messages, using IS-IS, OSPF or another link state routing protocol link state advertisement, enables multicast trees to be established using information already contained in the intermediate nodes' link state databases. Multicast trees, such as sparse multicast trees, may thus be created simply by causing destination nodes that want to join a multicast to transmit a link state advertisement with the new membership information. The link state advertisement will be forwarded over the network to all nodes on the network to enable the nodes to update their link state database. When the nodes determine that the link state advertisement contains multicast membership information associated with the destination (source of the link state advertisement), each node will calculate whether it is on a shortest path from the multicast source to the multicast destination and, if so, will install forwarding state for the multicast in its forwarding information base. When the source transmits data for the particular multicast, the interior nodes will selectively transmit the data over only those branches of the source's multicast tree that have been installed in the intermediate nodes FIBs so that copies of the packets will be forwarded to the destinations that are members of the multicast.

FIG. 1 is a schematic representation of an example of a portion of a link state protocol controlled Ethernet network. From the shared network topology each node calculates optimal shortest paths to other provider backbone bridges (PBB) or nodes in the network using a shortest path algorithm. The outcome of the application of the shortest path algorithm across the network, and the corresponding population of the FIB in the bridges, provides a unique tree through the mesh from each bridge to the member bridges of the network.

For a given bridge node to determine if it is on the shortest path between a given pair of bridges, various shortest path algorithms can be used to compute optimal paths. A graph based algorithm such as Floyd's algorithm [R. Floyd: Algorithm 97 (shortest path), Communications of the ACM, 7:345, 1962] or Dijkstra's algorithm [E. W. Dijkstra: A note on two problems in connexion with graphs, Numerical Mathematics, 1:269-271, 1959] can be implemented in the PLSB bridge to compute the shortest path between peer nodes. It should be understood that any suitable shortest path algorithm could also be utilized. Floyd's algorithm computes a distance matrix from a cost matrix where as Dijkstra algorithm computes the shortest distances from a vertex to all other vertices. It should be noted that the number of trees does not impact the computational complexity of the basic Floyd's algorithm.

The shortest path algorithm can be modified to take into account traffic engineering information. For example, the shortest path can include a measure of cost such as capacity, speed, usage and availability. The preservation of Source MAC between bridges means actual traffic matrix can be observed and used as input into the routing system and minimizing standard deviation of per link loading and facilitate load balancing. It should also be noted that a side-effect of the shortest path algorithms is that "loop-free alternates", the accepted industry term for a next hop which is known to be closer to the destination than the current node, for connectionless fast re-route may be computed as part of computing the network connectivity.

As shown in FIG. 2b, looking from device B to bridge 122, the tree resulting from the shortest path algorithm is different then the tree from device A to bridge 110 shown in FIG. 2a. Traffic from device B may arrive at it's destination by the shortest path from connecting bridge 122 and the tree created can be unique as viewed from the bridge. Unique trees from each bridge allow for effective utilization of the network links. However, the path between two devices (A and B) or associated bridges will be symmetrical and therefore the same in each direction.

The MAC addresses associated with a bridge (unicast and multicast) are global to the link state protocol controlled Ethernet network and are used for destination based forwarding. This means they can be simply flooded in routing system advertisements and, upon local convergence of the routing system, can be instantiated in the local bridge forwarding database (or FIB) as directed by the routing system. In this way distributed computation of layer 2 connectivity can be applied to Ethernet bridges without requiring a distinct signaling system to associate connectivity with topology. In its simplest form, when a bridge has computed that it is on the shortest path between two given bridge nodes, it simply installs the MAC addresses associated with those bridges in the FIB, the unicast MAC addresses pointing to each of the bridges of interest and the multicast MAC address(es) pointing from the bridges of interest.

It should be understood that although a single unicast MAC address per bridge has been described, nothing precludes the use of finer granularity, and a unicast MAC address may refer to a line card, a virtual switch instance (VSI) or UNI port. This may be desirable to simplify de-multiplexing of flows at a destination bridge.

Loop suppression is required in the network to maintain connectivity (albeit in a potentially degraded form) during periods of instability (the period between a topology change, advertisement of the topology change by the routing system to all bridges in the network, and re-convergence on a common view of the new topology and corresponding update of forwarding information). Instability in a distributed system frequently means that, at least temporarily, the overall view of the network will not be synchronized. Where the network elements do not have a synchronized view of the network it is possible for transitory loops to be formed. PLSB networks may use reverse path forwarding checks to minimize loops as described in greater detail in the parent application. RPFC checks may be performed by causing a network element such as an Ethernet bridge to check packets by comparing the Source MAC address contained in the packet and the segment on which the packet arrives, with the values that are configured for that same MAC address as a destination in the forwarding database. If the learned segment for the source MAC address would modify a static entry, or there is no static entry, then the packet is discarded. RPFC checks may optionally be disabled in particular instances as desired.

Where logical multicast trees are to be formed on a PLSB network, community of interest information may be added to the routing advertisements such that a bridge determines that when it is on the shortest path between two nodes, if they have intersection of community of interests, it can modify what is populated in the forwarding tables accordingly. One example of a community of interest attribute may be membership in a physical or logical multicast. For example, an intersection of a community of interest may occur where a destination node indicates that it would like to join a multicast being hosted by a source. In this instance the source and the advertising destination have a community of interest. Those intermediate nodes on the shortest path between the source and the advertising destination may implement this intersection of community of interest by populating their forwarding tables with a correlation between the multicast community of interest attribute and the forwarding action to be taken on frames that have the multicast attribute. Where the community of interest relates to membership in a logical multicast tree, the intermediate nodes may install forwarding state based on the logical multicast tree, or two or more logical trees may be combined to form a physical multicast tree, and the intermediate nodes may then install forwarding state for the physical tree rather than for the several logical trees.

Multicast on a link state protocol controlled Ethernet network may be implemented on the basis of Ethernet MAC addresses (e.g. as opposed to flooding in a VLAN). Ethernet multicast MAC addresses include an explicit multicast indication on the destination MAC address which permits unique policing treatment to be applied to unicast or multicast packets.

Figure 2:
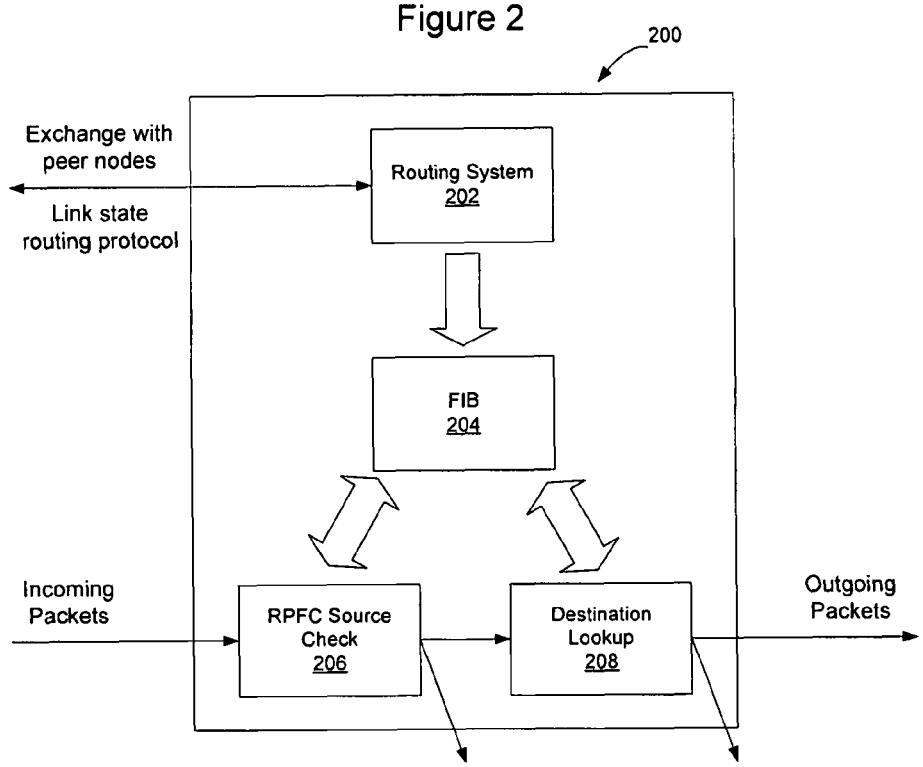
FIG. 2 is a schematic representation of a link state protocol controlled Ethernet network element.

FIG. 2 is a schematic representation of a possible implementation of a network element 200 configured to be used in a link state protocol controlled Ethernet network. The routing system module 202 exchanges information with peer bridges in the network regarding the network topology using a link state routing protocol. As discussed previously, the exchange of information allows the bridges to generate a synchronized view of the network topology which then allows the routing system 202 module to calculate the shortest path tree (using an algorithm discussed above) during convergence. The FIB 204 is populated with the appropriate entries for directing traffic through the network based upon the determined paths.

A RPFC source check module 206 processes incoming packets 200 and performs a lookup in the FIB 204 to determine if the received port coincides with the port identified in the FIB 204 for the particular Source MAC. If the received port/Source MAC does not match the expected port/Source MAC, the packet is discarded. If the packet passes the RPFC source check 206 module, or if the check is disabled, the destination lookup 208 module determines from the FIB 204 the port or ports over which the packet should be forwarded. If there is not a valid entry the packet may then be discarded. It should also be understood that the modules described are for illustrative purposes only and may be implemented by combining or distributing functions among the modules of a bridge node as would be understood by a person of skill in the art.

A link state protocol controlled Ethernet network can support multiple communities of interest, where any individual community only requires connectivity to a subset of the ports and therefore bridges in the network. As used herein, the term "logical multicast" will be used to refer to an individual community of interest, and the term "physical multicast" will refer to a group of logical multicasts that is installed in the forwarding tables of the network elements on the link state protocol controlled Ethernet network. To enable packets to be transmitted to a particular logical multicast, the multicast connectivity needs to be constrained at the network elements implementing the link state protocol controlled Ethernet network so that the logical multicast packets are not transmitted to all destination nodes on the network. One way to do this is to associate a community of interest identifier with a particular set of destination nodes, and install forwarding state in the intermediate nodes based on the community of interest identifier.

One example of an identifier that may be used to identify packets associated with a particular community of interest is the extended service ID field (I-SID) defined in IEEE 802.1ah. The community of interest (e.g. I-SID) identifier can also be incorporated into routing system advertisements so that nodes may identify interest in I-SID identified communities of interest. A bridge that finds itself on the shortest path between two bridges installs the unicast MAC address(es) associated with each bridge, and the multicast MAC addresses for all I-SIDs common to the two bridges. The consequence of this is that a given edge bridge will have unicast connectivity to all peer bridges, and multicast connectivity unique to each I-SID identified community of interest. This will be in the form of being a leaf on a multipoint-to-point (mp2p) unicast tree to each peer, and being the root of an (S,G) point-to-multipoint (p2mp) multicast tree, where S is the address of the source and G is the multicast group address, to the set of peer nodes for each community of interest. If the bridge pair has no I-SIDs in common, a further refinement could be that no unicast MAC address is installed. Similarly the bridge pair may be transit bridges and have chosen not to offer any MAC information for flows either terminated or originated by the node. In this way, not only is multicast connectivity confined to specific groups of interest, the approach is frugal in consumption of forwarding table space for unicast connectivity.

Each I-SID identified community of interest may be associated with a particular logical multicast, in which packets containing a particular I-SID value will be forwarded to a particular set of nodes on the network. Each logical tree thus extends from a given source to a group of destination nodes, so that multiple logical multicast trees may exist from a given source on the network. Since the shortest path from each source node to the destination nodes is different, the logical multicast trees are source dependent and not shared by multiple sources. Accordingly, as logical multicast trees are built, the number of logical multicast trees and hence the amount of information required to be stored in the FIB will increase.

According to an embodiment of the invention, to reduce the amount of information required to be stored to implement multiple logical multicast trees, physical multicast trees are created from each source. Each physical multicast tree includes two or more logical multicast trees. The physical multicast tree is implemented as a shortest path tree rooted at a common source of the logical multicast trees that are subsumed in the physical multicast tree, and includes the union of the destinations from all subsumed logical multicast trees.

In connection with sparse multicasts, the multicast tree for a given multicast from a given source may not need to include all of the branches of the entire shortest path tree rooted at the source. Accordingly, the interior nodes may determine if they should install forwarding state for a given multicast based on whether they are on a shortest path between the source and a destination that has advertised membership in the multicast. In this manner, destinations that would like to be included in a multicast may advertise their request to join a multicast using a link state advertisement, and the intermediate nodes may determine, based on the link state database, whether to install forwarding state for that particular multicast based on their determination as to whether they are on a shortest path between the destination node and the source of the multicast.

As described in greater detail below, where there are a small number of logical multicasts, advertisement and installation of forwarding state may occur on a per-logical multicast basis. As the number of logical multicasts increases, however, groups of logical multicasts may be formed which will be referred to herein as "physical multicasts". Each physical multicast is thus formed of two or more logical multicasts that extend from a given source to two or more sets of destination nodes.

When physical multicast forwarding is implemented on the intermediate nodes, the destination nodes may advertise membership in a physical multicast, as described in connection with FIG. 4, or may advertise membership in a logical multicast as described in connection with FIG. 5. In either embodiment, the interior nodes on the network will install forwarding state for the physical multicast tree if it is on a shortest path from a source to a destination of one of the logical multicasts assigned to the physical multicast tree. Since multiple logical multicast trees may be included in a given physical multicast tree, this allows the interior nodes to have less state information and less dynamic state information in their forwarding tables than would otherwise be required.

Figure 3:
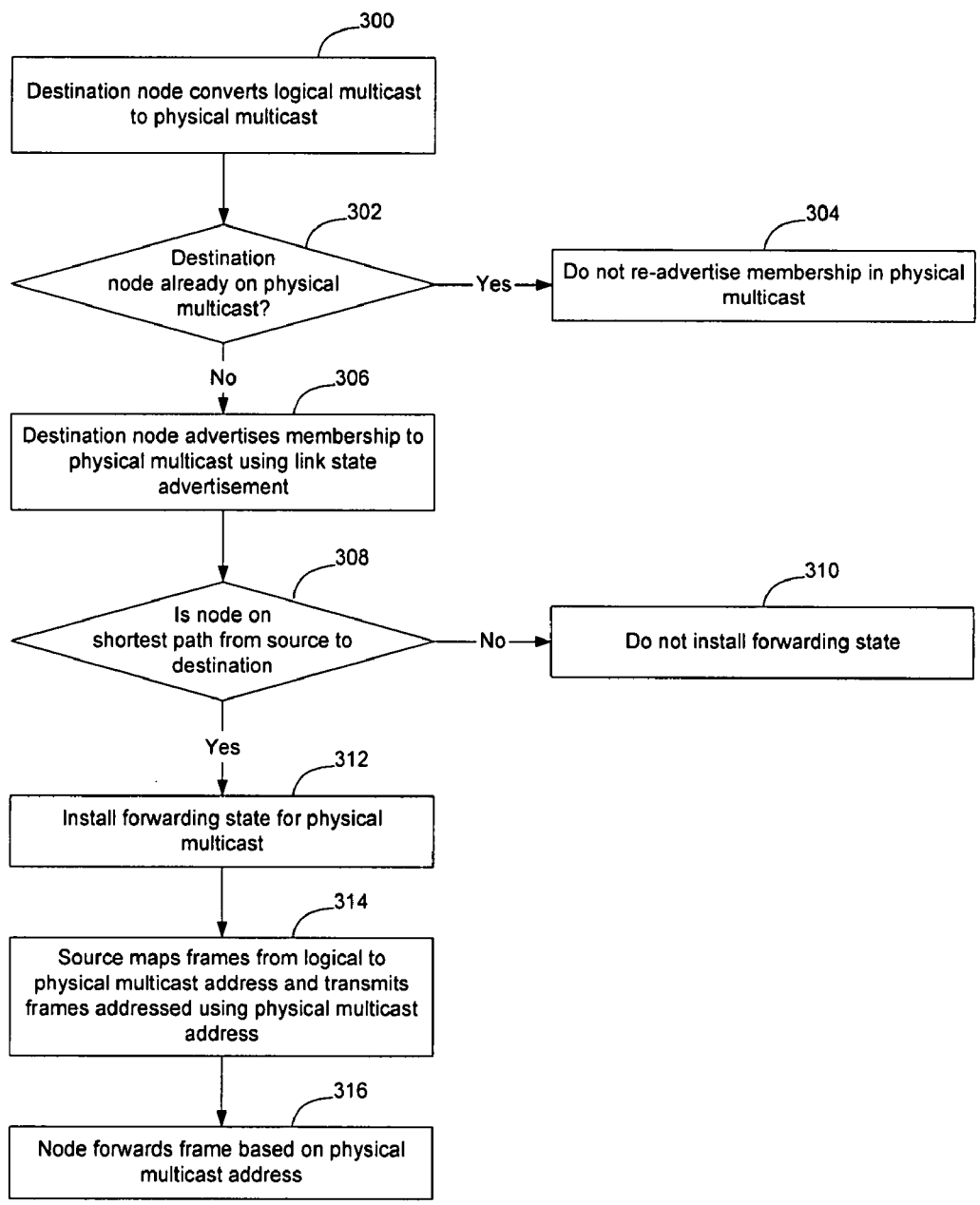
FIG. 3 is a flow diagram illustrating one example of multicast implementation in a link state protocol controlled Ethernet network according to an embodiment of the invention.
Figure 4:
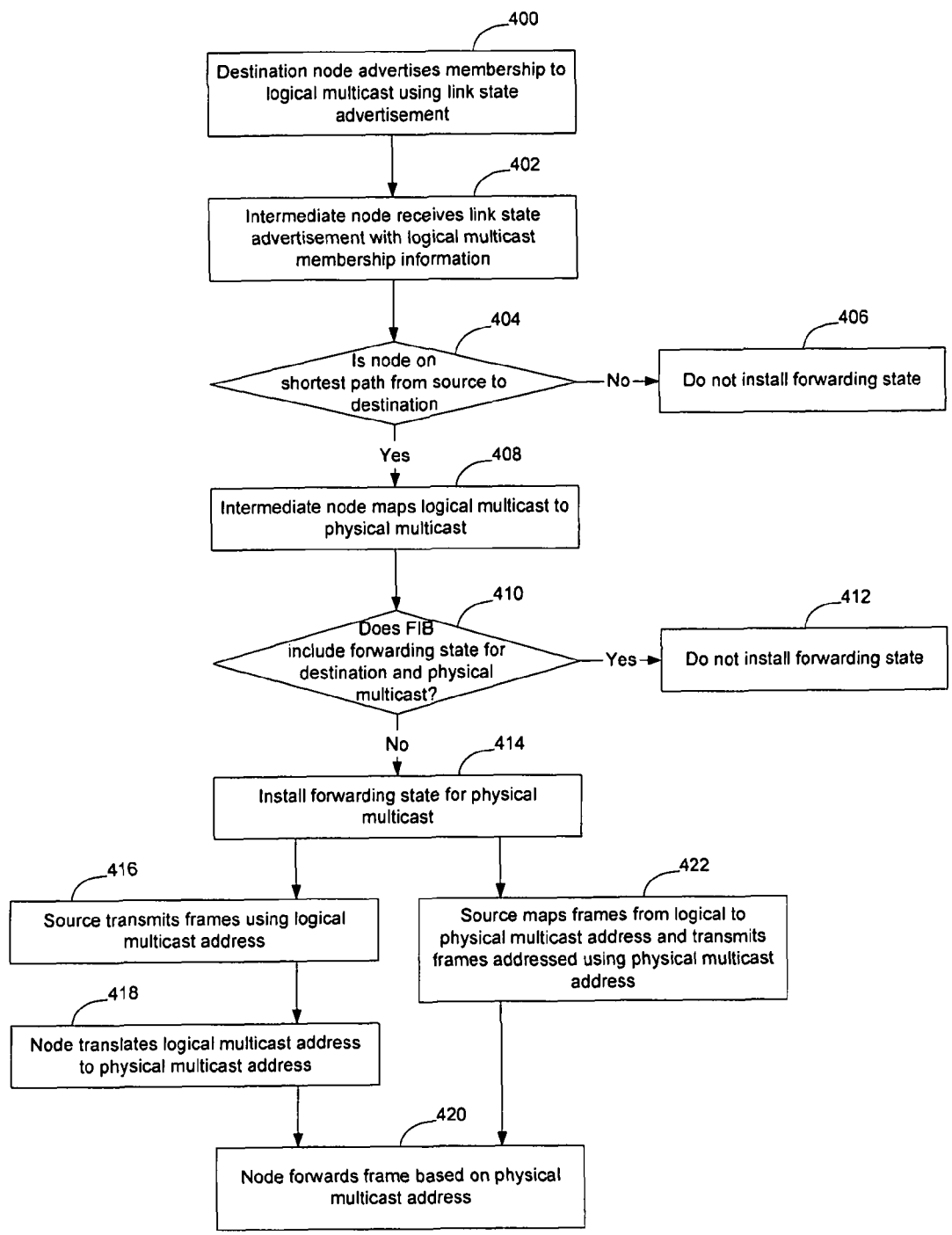
FIG. 4 is a flow diagram illustrating another example of multicast implementation in a link state protocol controlled Ethernet network according to another embodiment of the invention.

FIG. 4 shows one embodiment in which the destination nodes advertise membership in a physical multicast tree. As shown in FIG. 3, when a destination node determines that it would like to join a logical multicast, it will convert the logical multicast to a physical multicast value (300). Many ways of mapping a large set of logical multicasts to a smaller set of physical multicasts may be used and the invention is not limited to any particular mapping algorithm. For example, the mapping may be performed by hashing the logical multicast ID, although other algorithms also may be used as well and the invention is not limited to the use of this one particular algorithm.

Once the logical to physical mapping has occurred, the destination node will check to determine whether it has already advertised membership to that physical multicast (302). Since many logical multicasts may be carried on a given physical multicast tree, and information for all logical multicasts will be transmitted to all destination nodes that have advertised membership in the physical multicast tree, the node will not need to readvertise membership in the tree to receive information for other logical multicasts. Thus, where the node is already a member of the physical multicast tree it will not re-advertise membership upon joining the new logical multicast but rather will stop discarding those packets as they arrive (304).

If the destination node has not already advertised membership to the physical multicast, it will do so using a link state advertisement (306). The link state advertisement will propagate throughout the link state protocol controlled Ethernet network as a standard link state advertisement to be forwarded to all nodes on the network.

When a node receives a link state advertisement containing multicast membership information, the intermediate node will determine whether it is on the shortest path from the source to the advertising destination (308). If not, it will not install forwarding state for the multicast (310). Otherwise, if it is on the shortest path between the source and destination, the node will install forwarding state for the destination and the physical multicast (312).

In operation, the source will map frames from the logical to physical multicast and transmit the frames onto the link state protocol controlled Ethernet network by addressing the frames to the physical multicast address (314). The intermediate nodes will forward the frames based on the installed state for the physical multicast address (316) so that all destination nodes on a given physical multicast will receive a copy of all frames transmitted over the physical multicast. Since there may be two or more logical multicasts associated with a given physical multicast, the end nodes will filter frames to select frames associated with logical multicasts of interest and discard frames associated with other logical multicasts that are not of interest.

Since the destination nodes advertise membership in physical rather than logical multicasts, the source may not know which logical multicasts are being subscribed to by destination nodes. Optionally, as nodes subscribe to logical multicasts and leave logical multicasts, the nodes may unicast a message to the source indicating the join/leave decision so that the source may keep track of which destination nodes are part of the various logical multicasts. When no destination node is part of a logical multicast the source may thus stop transmitting frames associated with the logical multicast on the physical multicast tree.

Advertisement in a multicast may take many forms depending on the particular way in which the intermediate nodes maintain their forwarding tables. For example, where the intermediate nodes remove forwarding entries over time if they are not refreshed, the destination nodes may be required to periodically advertise membership in the physical multicast to continue to be part of the physical multicast. The same process described above may be implemented by causing the destination nodes to advertise membership periodically while a member of any one of the logical multicasts and causing the destination node to stop advertising membership once the node is no longer a member of any of the logical multicasts.

FIG. 4 illustrates another embodiment in which the destination nodes advertise membership in the logical multicast and the intermediate nodes map the logical multicasts to physical multicasts before installing state for the physical multicast. As shown in FIG. 4, when a destination node would like to join a multicast from a source, it will advertise membership to the logical multicast using a link state advertisement (400). An intermediate node, upon receiving the link state advertisement (402), will determine if it is on the shortest path from the source to the destination (404). If the node is not on the shortest path between the source and destination, forwarding state is not required to be installed for the multicast and the intermediate node will ignore the link state advertisement (406). Of course, where required, the intermediate node will forward the link state advertisement to other nodes on the network in the same manner as it would forward other link state advertisements.

If the intermediate node is on the shortest path, the intermediate node will map the logical multicast to one of the physical multicasts (408). Several ways of mapping logical multicasts to physical multicasts may be used, as discussed above, and the invention is not limited to the use of a particular mapping function. As long as the same mapping function is used by all the intermediate nodes a consistent view of the network will be maintained and the physical multicast trees may be established to carry multicast information for the logical multicasts.

Once the intermediate node has mapped the logical multicast to one of the physical multicasts, the intermediate node will determine if its FIB already includes forwarding state for the destination and the physical multicast (410). Because many different logical multicasts may transmit data using the same physical multicast distribution tree, and because all destinations on the physical multicast distribution tree will receive frames for each of the logical multicasts being carried for that tree, an intermediate node is only required to install forwarding state one time for a given physical multicast and destination node pair. Thus, where the destination node is on a first logical multicast and would like to join a second logical multicast that is part of the same physical multicast, no additional state will be required to implement this second logical multicast on the intermediate nodes. In this instance the link state advertisement may be ignored (412) since the node already has installed state for the physical multicast. If the intermediate node does not have forwarding state installed for the physical multicast, the FIB will install forwarding state so that frames addressed to the logical multicast are forwarded to the destination (414).

In operation, the source may transmit frames using either the logical multicast or physical multicast address. If the source transmits frames using the logical multicast address (416) the node will translate the logical multicast address to the physical multicast address (418) and forward the frame based on the physical multicast address if it has forwarding state for the physical multicast address in its forwarding tables (420). Alternatively, the source may map the logical multicast to physical multicast and transmit frames using the physical multicast address (422) as described in greater detail above. The node will then forward the frames based on the physical address (420).

Where the source node addresses frames using the physical multicast address, the source node will also need to include a logical multicast ID in the frame so that the destination nodes can select frames that are part of logical multicasts that are of interest.

Figure 5:
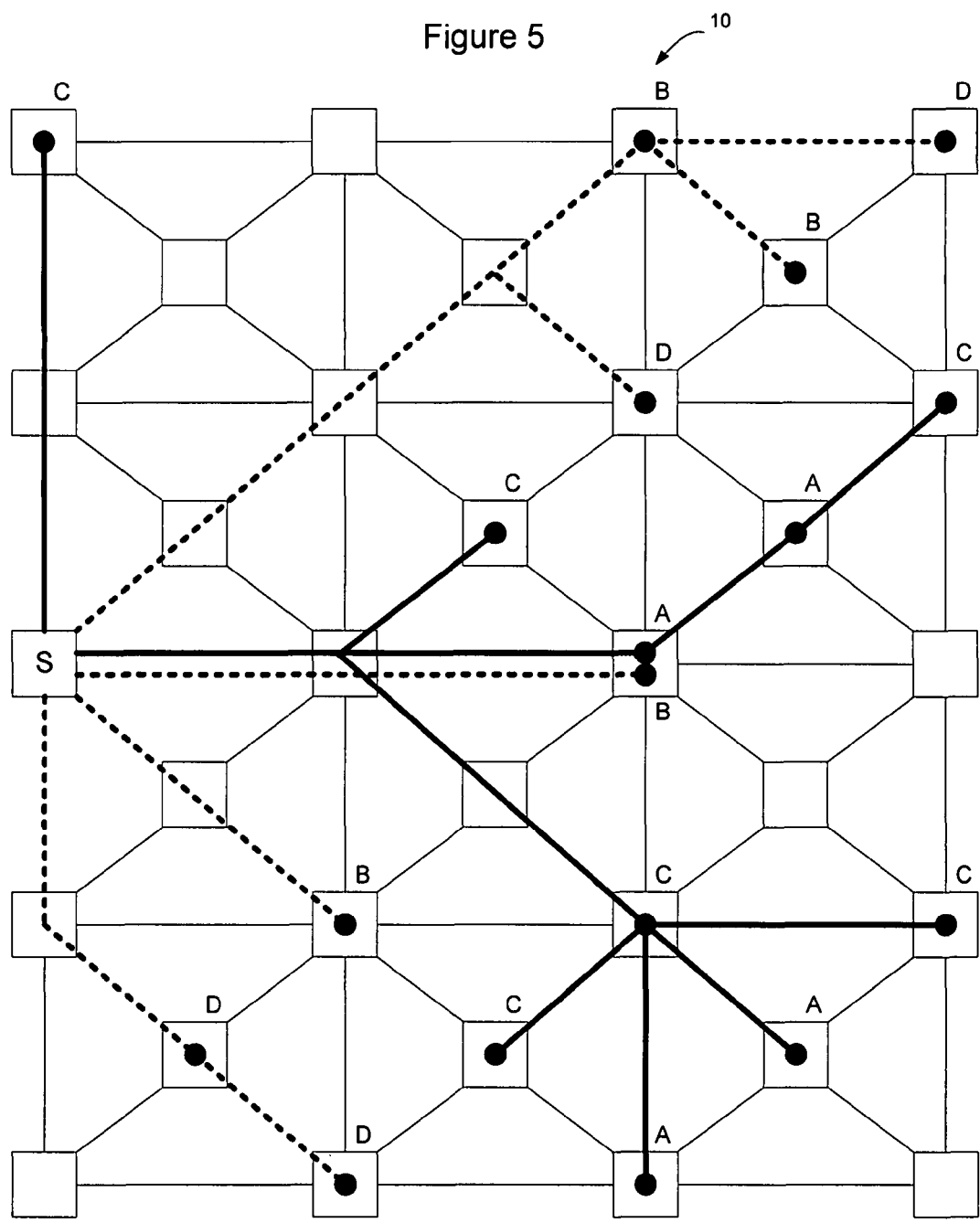
FIG. 5 is a schematic representation of a mesh network showing two physical multicasts subsuming four logical multicasts from a source node S.

FIG. 5 shows a link state protocol controlled Ethernet network in which two physical multicast trees have been implemented to support multiple logical multicasts. In the illustrated embodiment, physical tree 1 (shown using solid lines) is being used to carry traffic for logical multicasts A and C, and physical tree 2 (shown using dashed lines) is being used to carry traffic for logical multicasts B and D. Multiple logical multicasts may be mapped to a given physical multicast tree to reduce the forwarding state required to be installed on the intermediate nodes.

The multicast IDs may be implemented using ISIDs, which are 23 bit numbers defined in IEEE 802.1ah and are conventionally used to separate traffic into flows on the network. Each node (destination) on the network may advertise a set of ISIDs that it supports using ISIS link state advertisements. Each ISID may correspond to a logical multicast that is to be formed on the network. By advertising support for an ISID, traffic on the logical multicast will be forwarded to the destination node by causing the intermediate nodes on the network that are on the shortest path between the source and the destination to install forwarding state for the ISID. Alternatively, a subset of ISIDs may be used to designate the physical multicasts, and the nodes may advertise, using ISIS link state advertisements, the physical multicast ISIDs that are supported at the node.

Each node can advertise its set of supported ISIDs. Although the set may be ordered, according to an embodiment of the invention the set may be unordered so that the order won't change if other ISIDs become supported. This enables the ISIDs to be stored in any convenient manner by the intermediate nodes. As new ISIDs are advertised they may be stored at the end of the list of ISIDs by an intermediate node to avoid requiring the intermediate node to reorganize its forwarding tables.

When an ISID is removed, for example where a destination node no longer has any connected devices that are members of the logical multicast, the destination node may advertise a remove ISIS link state message indicating that the forwarding state for a particular ISID is no longer required to that destination. An intermediate node may update its forwarding tables by removing the forwarding state for that ISID if it is no longer on a shortest path to any destination. Similarly, an intermediate node may update its forwarding tables to remove part of the state for a particular ISID where it is a branching intermediate node (the shortest path first tree branches at the node) and there is no longer any subscribing destination node on one of the branches.

Upon receipt of a removal message, the intermediate node may simply zero out the entry for the ISID rather than updating the table. Periodically, as the number of zeroed out entries increases, the tables may be compressed to reorganize the tables and remove blank entries that were formed in connection with removal messages.

According to an embodiment of the invention, a multicast address may be formed as a 48 bit address including a one bit multicast flag, a one bit declash indicator, a 22 bit nodal nick name, and a 24 bit ISID. The combination of nickname and ISID uniquely identifies traffic on the multicast. The nick name may be formed as the XOR between the highest 22 bits and the lowest 22 bits of the node MAC address or in another manner.

To install state for multicasts on the network, an intermediate node will access the advertised ISID data for each node N(i) in the network. The intermediate node will then perform an all pairs shortest path first computation to determine how to handle multicast data that is received with that ISID. The pseudo code in Table I may be used to implement an embodiment of the invention. The invention is not limited to this particular implementation however, as other ways of implementing this process may be used as well. The pseudo code may be implemented, for example, by the routing system 202 of the network element shown in FIG. 2.

TABLE I

```
for each dest in N[*] excluding SELF
{
    if (dest.advertisedISIDset != null) {
        foreach src in N[*] excluding SELF , excluding dest
        {
            intersection = dest.advertisedISIDset AND src.advertisedISIDset
            foreach isid in intersection
            {
                // src and dest share an isid
                path = SPF(src, dest)
                foreach link in SELF.allLinks
                {
                    if (link is member of path) {
                        // this link is on SPF between a src/dest that share isid
                        // and is one of my links .. so.
                        // create a multicast entry.
                        address.multicast = 1
                        address.declash indicator = src.declash indicator
                        address.nickname = src.nickname
                        address.isid = isid
                        add forwarding entry for
                            address =>link
                    }
                }
            }
        }
    }
}
```

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application. Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of installing forwarding state in a link state protocol controlled Ethernet node of a link state protocol controlled Ethernet network, the method comprising the steps of:
  a node of the link state protocol controlled Ethernet network mapping two or more logical multicasts to a physical multicast, the physical multicast including a superset of destinations of the logical multicasts; and
  installing forwarding state for the physical multicast in a forwarding information base of the link state protocol controlled Ethernet node, such that traffic of any one of the logical multicasts is forwarded to the superset of destinations;
  wherein the mapping is performed by hashing a multicast ID value with a source MAC address.

2. The method of claim 1, wherein the step of mapping is performed by the link state protocol controlled Ethernet node.

3. The method of claim 1, wherein the step of mapping is performed by one or more destination nodes on the link state protocol controlled Ethernet network, the method further comprising the steps of receiving link state advertisements containing multicast membership information relating to the physical multicast by the link state protocol controlled Ethernet node and using the multicast membership to perform the step of installing.

4. The method of claim 1, wherein each of the logical multicasts extends from a common source node, and each of the logical multicasts includes a subset of destination nodes on the link state protocol controlled Ethernet network.

5. The method of claim 4, wherein at least two of the logical multicasts include different subsets of destination nodes on the link state protocol controlled Ethernet network.

6. The method of claim 5, wherein the link state protocol controlled Ethernet node installs forwarding state for all destination nodes for which it is on a shortest path between that destination node and the source node.

7. The method of claim 1, wherein the link state protocol controlled Ethernet node forwarding information base contains forwarding state for other physical multicasts, each of the physical multicasts having two or more logical multicasts mapped to them.

8. The method of claim 7, the method further comprising the steps of identifying packets associated with the physical multicasts, and selectively forwarding the packets according to the forwarding state for the physical multicasts in the forwarding information base.

9. The method of claim 8, wherein the packets are addressed using logical multicast addresses, the method further comprising the step of mapping the logical multicast addresses to one or more of the physical multicasts before selectively forwarding the packets according to the forwarding state for the physical multicasts.

10. The method of claim 8, wherein the packets are addressed using the physical multicast address.

11. A method comprising the steps of:
  receiving, by a link state protocol controlled Ethernet node, a plurality of link state advertisements containing link state information about a configuration of an Ethernet network;
  using the link state advertisements to build a forwarding information base;
  receiving, by the link state protocol controlled Ethernet node, a link state advertisement containing multicast membership information related to a logical multicast;
  mapping, by the link state protocol controlled Ethernet node, the logical multicast to a physical multicast, the physical multicast including a superset of destinations of two or more logical multicasts mapped to it; and
  installing forwarding state in the forwarding information base for the physical multicast, such that traffic of any one of the logical multicasts mapped to the physical multicast is forwarded to the superset of destinations;
  wherein the mapping is performed by hashing a multicast ID value with a source MAC address.

12. The method of claim 11, wherein the step of installing forwarding state is performed only if the link state protocol controlled Ethernet node is on a shortest path between a source of the physical multicast and a destination node associated with the link state advertisement.

13. The method of claim 11, wherein multiple logical multicasts are able to be mapped to a physical multicast.

14. The method of claim 13, wherein the step of installing forwarding state is performed only if the link state protocol controlled Ethernet node is on a shortest path between a source of the physical multicast and an advertising node associated with the link state advertisement, and only if the link state protocol controlled Ethernet node has not already installed state between the source and the advertising node for the physical multicast in connection with a second logical multicast.

15. A method of implementing multicast on a link state protocol controlled Ethernet network, the method comprising the steps of:
  converting, by a destination node, logical multicast membership information associated with a first logical multicast into physical multicast membership information associated with a physical multicast, wherein the physical multicast subsumes the first logical multicast and at least one other logical multicast and includes a superset of destinations of the subsumed logical multicasts, such that traffic of any one of the plurality of logical multicasts is forwarded to the superset of destinations;
  determining by the destination node, whether it has recently advertised membership in the physical multicast;
  advertising on the link state protocol controlled Ethernet network, by the destination node, membership to the physical multicast if it has not recently advertised membership in the physical multicast; and
  not advertising membership to the physical multicast if it has recently advertised membership in the physical multicast.

16. The method of claim 15, further comprising the step of receiving, by the destination node, packets associated with each of the subsumed logical multicasts.

17. The method of claim 16, further comprising the step of discarding, by the destination node, packets for logical multicasts other than the first logical multicast.

* * * * *